United States Patent
Koyama

(10) Patent No.: US 6,633,966 B1
(45) Date of Patent: Oct. 14, 2003

(54) FIFO MEMORY HAVING REDUCED SCALE

(75) Inventor: Masayuki Koyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/176,318

(22) Filed: Oct. 22, 1998

(30) Foreign Application Priority Data

Jun. 16, 1998 (JP) .......................... P10-168471

(51) Int. Cl.[7] .............................. G06F 12/00
(52) U.S. Cl. ................. 711/200; 711/217; 711/219
(58) Field of Search ................. 711/149, 167, 711/200, 213, 217, 219, 131; 365/189.01, 230.01, 194, 221, 230.05, 230.08, 233

(56) References Cited

U.S. PATENT DOCUMENTS

| | | | | |
|---|---|---|---|---|
| 5,220,529 A | * | 6/1993 | Kohiyama et al. | 365/189.01 |
| 5,761,150 A | * | 6/1998 | Yukutake et al. | 365/233 |
| 5,898,893 A | * | 4/1999 | Alfke | 395/877 |
| 5,914,897 A | * | 6/1999 | Koyama et al. | 365/189.01 |
| 5,956,748 A | * | 9/1999 | New | 711/149 |

FOREIGN PATENT DOCUMENTS

JP 6-5066 1/1994

OTHER PUBLICATIONS

M. Morris Mano, Computer Engineering Hardware Design, 1988 Prentice–Hall, Inc., 152–153.*

* cited by examiner

*Primary Examiner*—Kimberly McLean
(74) *Attorney, Agent, or Firm*—Oblon, Spivak, McClelland, Maier & Neustadt, P.C.

(57) ABSTRACT

FIFO type memory is provided on a small circuit scale. Reading of data Dout<3:0> from a two-port type RAM (101) is executed with respect to the address specified by a read address (21) in synchronization with the fall of a clock (CLK) provided to a clock end (CLR). Writing of data Din<3:0> on the RAM (101) is executed with respect to the address specified by a write address (22) in synchronization with the rise of a clock (CLK) provided to a clock end (CLW). In an address delayer (103) after a read address (21) taking an address value is outputted, a write address (22) taking the same address value is always outputted with a fixed delay, so that a memory (100) performs the FIFO type data input/output as a whole.

20 Claims, 6 Drawing Sheets

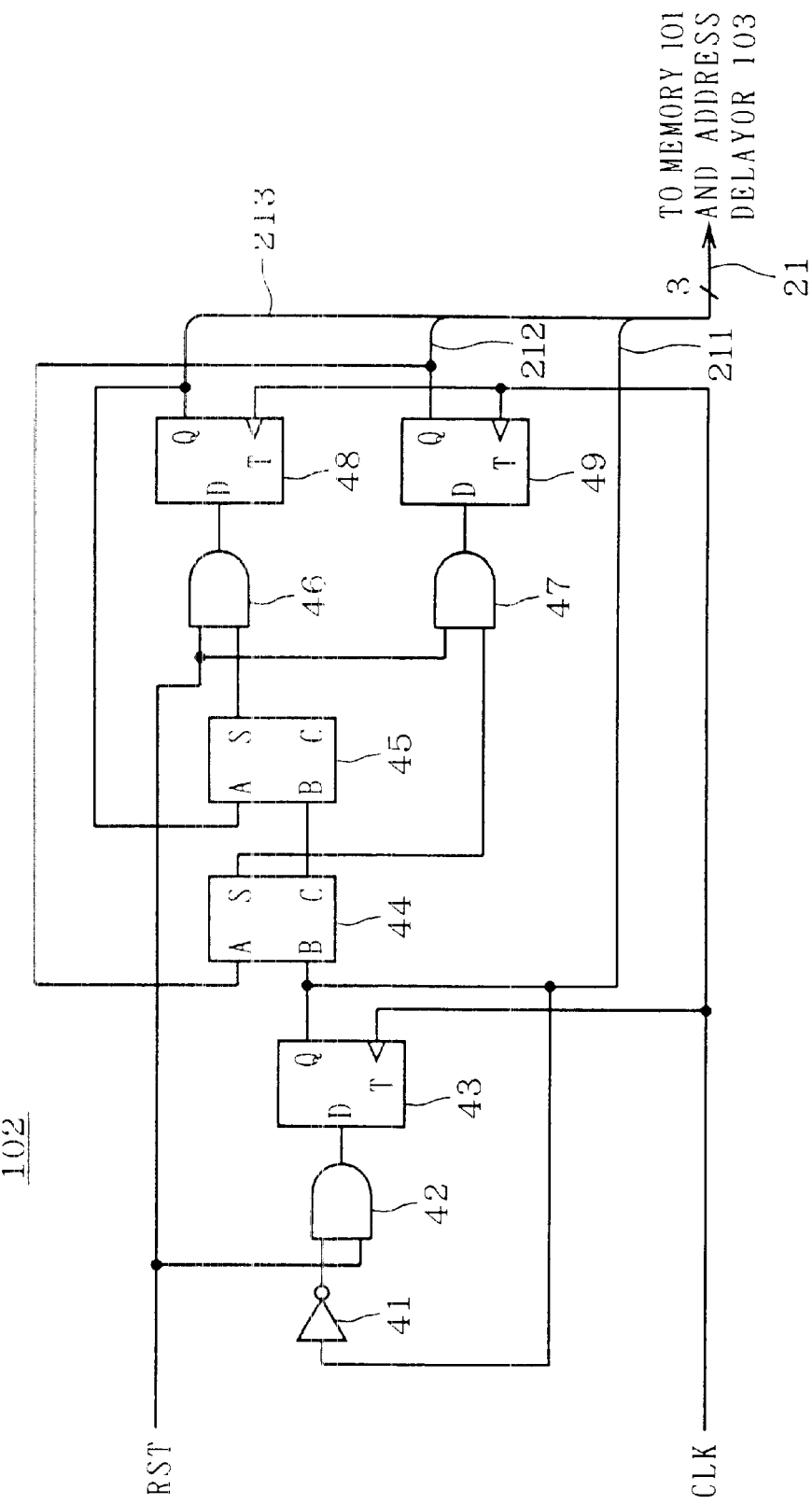
F I G. 3

FIFO MEMORY HAVING REDUCED SCALE

BACKGROUND OF THE INVENTION

1. Field of the Invention

The present invention relates to a memory and particularly to an FIFO (first-in first-out) type memory.

2. Description of the Background Art

FIG. 5 is a circuit diagram of the construction of a conventional FIFO type memory 200. The memory 200 is, for example, used for digital transmissions or communication units.

The memory 200 has a two-port type RAM 101 that can perform writing and reading independently, a read address generator 202 for generating a 3-bit read address 21, and a write address generator 203 for generating a 3-bit write address 22.

In synchronization with the fall of a signal provided to a clock end CLR, the RAM 101 outputs, as a data Dout<3:0>, the data stored in the address specified by the read address 21 inputted to a read address terminal RA<2:0>, from a data output end DO<3:0> (read operation). Also, in synchronization with the rise of a signal provided to a clock end CLW, the RAM 101 stores a data Din<3:0> inputted to a data input end DI<3:0> at the address specified by the write address 22 inputted to a write address terminal WA<2:0> (write operation). Here, a clock CLK is being provided to both the read clock end CLR and the write clock end CLW.

The memory 200 so constructed performs the FIFO type data input-output operation such that the write address 22 always takes the address value, which the read address 21 takes before a fixed period of time. FIGS. 6 and 7 are circuit diagrams showing the constructions of a read address generator 202 and a write address generator 203, respectively.

Referring to FIG. 6, when a reset signal RST is in the state of "L", the outputs of gates 40, 46 and 47 are always in "H", "L" and "L", respectively. Therefore, regardless of the number of times a clock CLK rises, Q-outputs of D-type flip-flops 43, 48 and 49 remain in "H", "L" and "L", respectively. Thereafter, when the reset signal RST becomes "H", the Q-output of the D-type flip-flop 43 inverted by an inverter 41 becomes the D-input of the D-type flip-flop 43 and, each time the clock CLK rises, the Q-output of the D-type flip-flop 43 alternates between "L" and "H". Consequently, the sum-outputs S of half adders 44 and 45 provide D-inputs of the D-type flip-flops 48 and 49, respectively. Since the D-inputs of the D-type flip-flops 48 and 49 become add-inputs A of the half adders 45 and 44, respectively, the Q-outputs of the D-type flip-flops 49 and 48 divide the clock CLK by two and four, respectively. Hence, let "H" be "1" and "L" be "0", a read address 21 is produced that cycles as follows: 001, 010, 011, ..., 111, 000, 001, ..., can be generated by locating the Q-outputs of the D-type flip-flops 48, 49, 43 in this order, i.e., in the order of descending bit position.

Referring to FIG. 7, when a reset signal RST is in the state of "L", the outputs of gates 42, 46 and 47 are always in "L", "L" and "L", respectively. Accordingly, in the same manner as in the address generator 202, a write address 22 is produced that cycles as follows: 000, 001, 010, ..., 110, 111, 000, ..., can be generated.

As stated earlier, in the conventional memory 200 there are provided a pair of very similar circuits and merely by a difference between the gates 40 and 42, the write address 22 generated by write address generator 203 is effectively delayed from the read address 21 by a period of one cycle of a clock CLK, thereby transmitting data with a delay of cycles, i.e., (the total number of addresses−1) (herein, $2^3-1=7$). Unfortunately, this increases the scale of a circuit needed in address generation.

SUMMARY OF THE INVENTION

According to a first aspect of the present invention, a FIFO type memory comprises: a read address generator for generating a read address in synchronization with a clock signal; an address delayor that generates a write address by delaying the read address in synchronization with the clock signal; and a storage element that inputs data to an address specified by the read address and outputs data from an address specified by the write address, in synchronization with the clock signal.

In the semiconductor memory of the first aspect, since a write address is generated by delaying a read address, the circuit scale required for generating write addresses can be reduced to realize the operation of the FIFO type.

According to a second aspect of the present invention, the FIFO type memory of the first aspect is characterized in that the read address is generated cyclically.

Preferably, the amount of delay of an address delayer is set to a period of a clock signal. As a result, a delay of data, i.e., storage, can be achieved by a period of a clock cycle being the longest in the FIFO operation, i.e., which is obtained by subtracting a one from the number of read address patterns to be generated cyclically.

According to a third aspect of the present invention, the FIFO type memory of the second aspect is characterized in that the address delayer has D-type flip-flops whose number is equal to the number of bits constituting the read address; and that each bit of the read address is provided to the data input ends of the D-type flip-flops.

Preferably, a clock signal is provided in common to each clock input end of the D-type flip-flops. This enables to obtain the respective bits constituting a write address from the data output ends of the D-type flip-flops.

Thus, an object of the present invention is to provide an FIFO type memory on a small scale circuit.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a circuit diagram showing an example of the construction of a read address generator;

DESCRIPTION OF THE PREFERRED EMBODIMENTS

Figure 1:
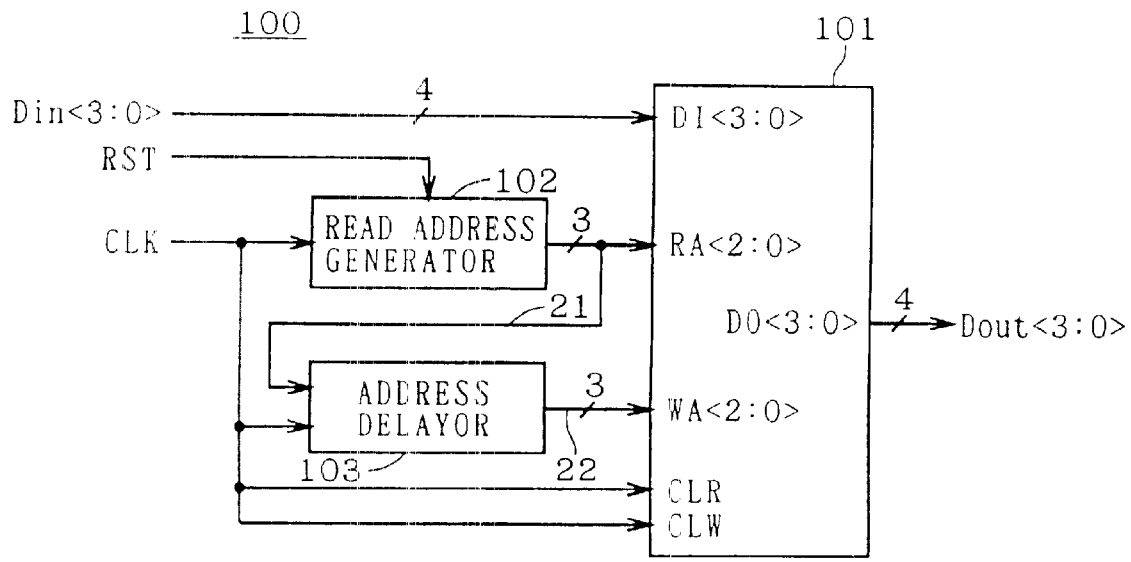
FIG. 1 is a circuit diagram of a memory construction according to one preferred embodiment of the present invention.

FIG. 1 is a circuit diagram of the construction of a FIFO type memory 100 according to one preferred embodiment of the present invention. The memory 100 comprises a RAM 101 being two-port type memory which can perform writing and reading independently, a read address generator 102 for generating a 3-bit read address 21, and an address delayer 103 that delays the read address 21 to generate a 3-bit write address 22.

The two-port type RAM 101 has a 4-bit data input end DI<3:0> to which a 4-bit data Din<3:0> is inputted, a 4-bit data output end DO<3:0> from which a 4-bit data Dout<3:0> is outputted, a read address terminal RA<2:0> to which a 3-bit read address 21 is inputted, a write address terminal WA<2:0> to which a 3-bit write address 22 is inputted, and a read clock end CLR and a write clock end CLW to which a clock signal for determining the timings of read and write, respectively.

The data Dout<3:0> from the RAM 101 is read in synchronization with the fall of the signal provided to the clock end CLR, and the data Din<3:0> is written on the RAM 101 in synchronization with the rise of the signal provided to the clock end CLW. In this case, a clock CLK is provided to both the read clock end CLR and the write clock end CLW.

In the address delayer 103, after a read address 21 is outputted, a write address 22 taking the address value taken by the read address 21 is outputted with a fixed delay. It is therefore possible to perform the data input-output of FIFO type in the same manner as in the conventional memory 200. Additionally, the address delayer 103 has a smaller circuit scale than the write address generator 203 used in the conventional memory 200, as described hereafter.

Figure 2:
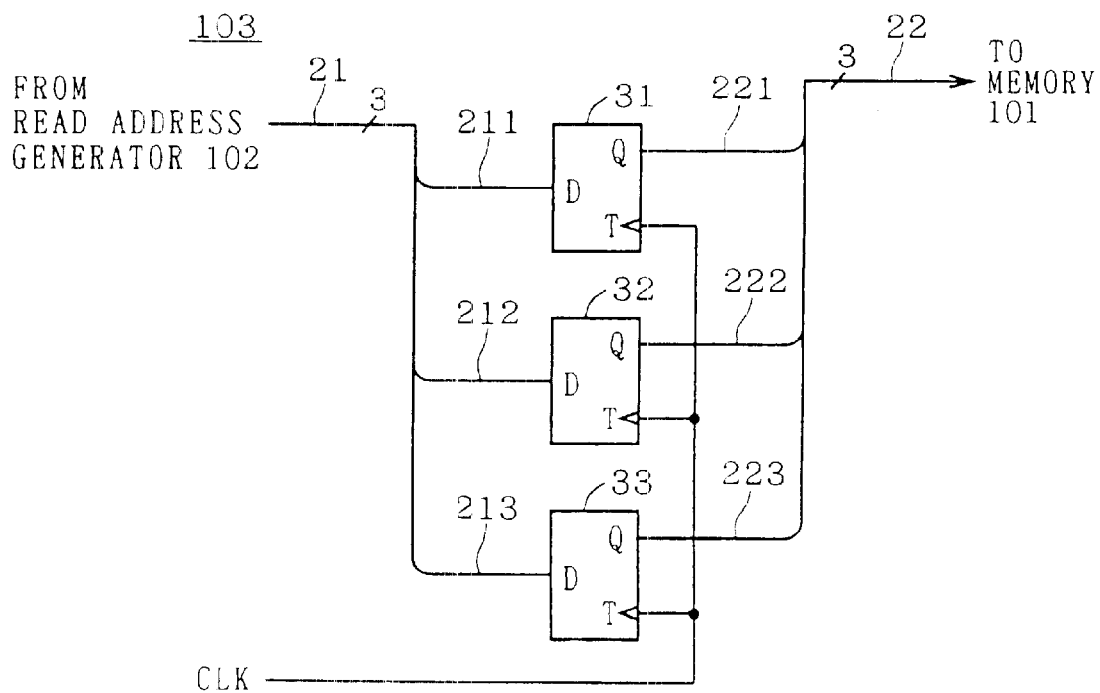
FIG. 2 is a circuit diagram of an address delayor construction.

FIG. 2 is a circuit diagram illustrating the construction of an address delayer 103. The address delayer 103 is generally comprised of D-type flip-flops whose number is equal to the number of bits of the read address 21 and the write address 22. Specifically, FIG. 2 shows an aspect where both the addresses 21 and 22 are of 3-bit. That is, the address delayer 103 has D-type flip-flops 31, 32 and 33. To their D-input terminals, the first to third bits 211, 212, 213, from the LSB of the read address 21, are provided from the read address generator 102, respectively. The clock CLK is provided to each clock input terminal T of the D-type flip-flops 31, 32 and 33. Accordingly, from the Q-output ends of the D-type flip-flops 31, 32 and 33, there are obtained the first to third bits 221, 222, 223 of the write address 22 which are obtained by delaying the first to third bits 211, 212, 213 of the read address 21 by one cycle of the clock CLK, respectively. They are then provided to the RAM 101 as a write address 22.

Figure 7:
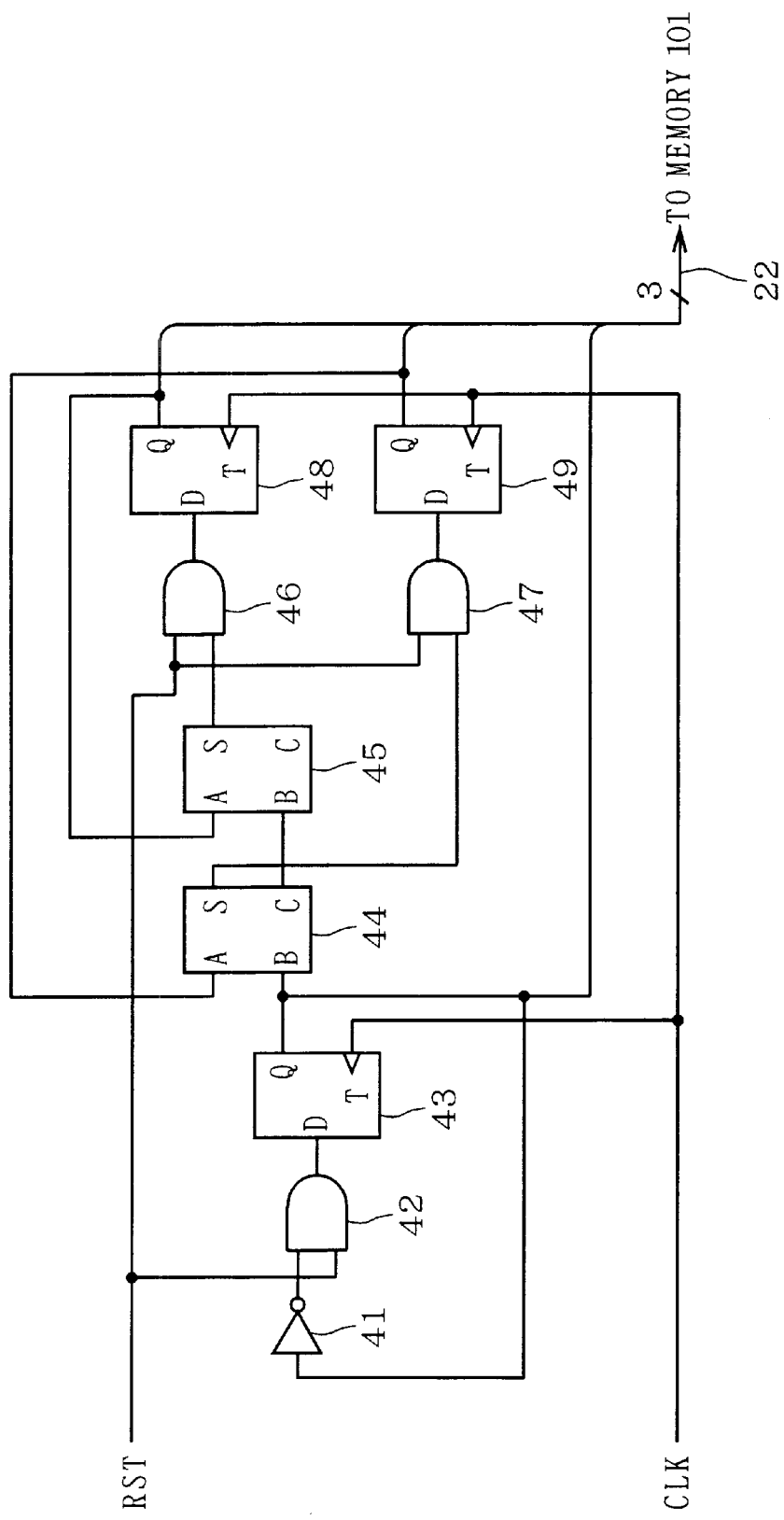
FIG. 7 is another circuit diagram of prior art.

Thus, the circuit scale of the address delayer 103 is reduced by three AND gates, one inverter and two half adders, when compared with the address generator 203 shown in FIG. 7. If the restriction on the circuit scale is loose, it is, of course, possible to cause a delay of two or more cycles of the clock CLK by adding D-type flip-flops. However, on the assumption that the read address 21 (accordingly, as well as the write address 22) occurs cyclically, a large delay of the data of the FIFO type memory 100 (i.e., the amount of data storage) can be obtained by delaying only one cycle of the clock CLK.

In addition, the address delayer 103 delays the read address 21 inputted thereto to generate the write address 22. Therefore, even if the read address 21 generated by the read address generator 102 causes a complex pattern, it is unnecessary to design an additional circuit for generating a pattern which is obtained by delaying such a complex pattern by a period of one cycle. That is, the address delayer 103 has extremely high flexibility with respect to the read address generator 102.

FIG. 3 is a circuit diagram illustrating the construction of the read address generator 102. The read address generator 102 comprises D-type flip-flops 43, 48 and 49, half adders 44 and 45, two-input AND gates 42, 46 and 47, and an inverter 41. The D-type flip-flops 43, 49 and 48 output the first to third bits 211, 212 and 213 of the read address 21, respectively. They are then provided to the RAM 101 and the address delayor 103, as the read address 21.

A reset signal RST is being inputted to the first input ends of the AND gates 42, 46 and 47. The output of the inverter 41, the sum-output S of the half adder 45 and the sum-output S of the half adder 44 are provided to the second D-input ends of the AND gates 42, 46 and 47, respectively. The output ends of the AND gates 42, 46 and 47 are connected to D-input ends of the D-type flip-flops 43, 48 and 49, respectively.

Q-output ends of the D-type flip-flops 43 and 48 are connected to the first input ends of the half adders 44 and 45, respectively. A Q-output end of the D-type flip-flop 49 is connected to the second input end of the half adder 44. The clock CLK is being provided to each clock input end T of the D-type flip-flops 43, 48 and 49.

A carry-output C of the half adder 44 is then provided to the second end of the half adder 45, and the Q-output end of the D-type flip-flop 43 is connected to the input end of the inverter 41.

When the reset signal RST is in the state of "L", the outputs of the AND gates 42, 46 and 47 are always in "L", "L" and "L", respectively. Therefore, regardless of the number of times the clock CLK rises, the Q-outputs of the D-type flip-flops 43, 48 and 49 remain in "L", "L" and "L", respectively. Thereafter, when the reset signal RST becomes "H", the Q-output of the D-type flip-flop 43 is inverted by the inverter 41 to be provided to the D-input of the D-type flip-flop 43 and, each time the clock CLK rises, the Q-output of the D-type flip-flop 43 alternates between "L" and "H". Accordingly, the Q-outputs of the D-type flip-flops 49 and 48 divide the clock CLK by two and four, respectively. Hence, let "H" be "1" and "L" be "0", the read address 21 is produced that cycles as follows: 000, 001, 010, ..., 111, 000, ..., can be generated by locating the Q-outputs of the D-type flip-flops 43, 49, 48 in this order, i.e., the first to third bits 211, 212, 213, from the LSB of the read address 21.

Figure 4:
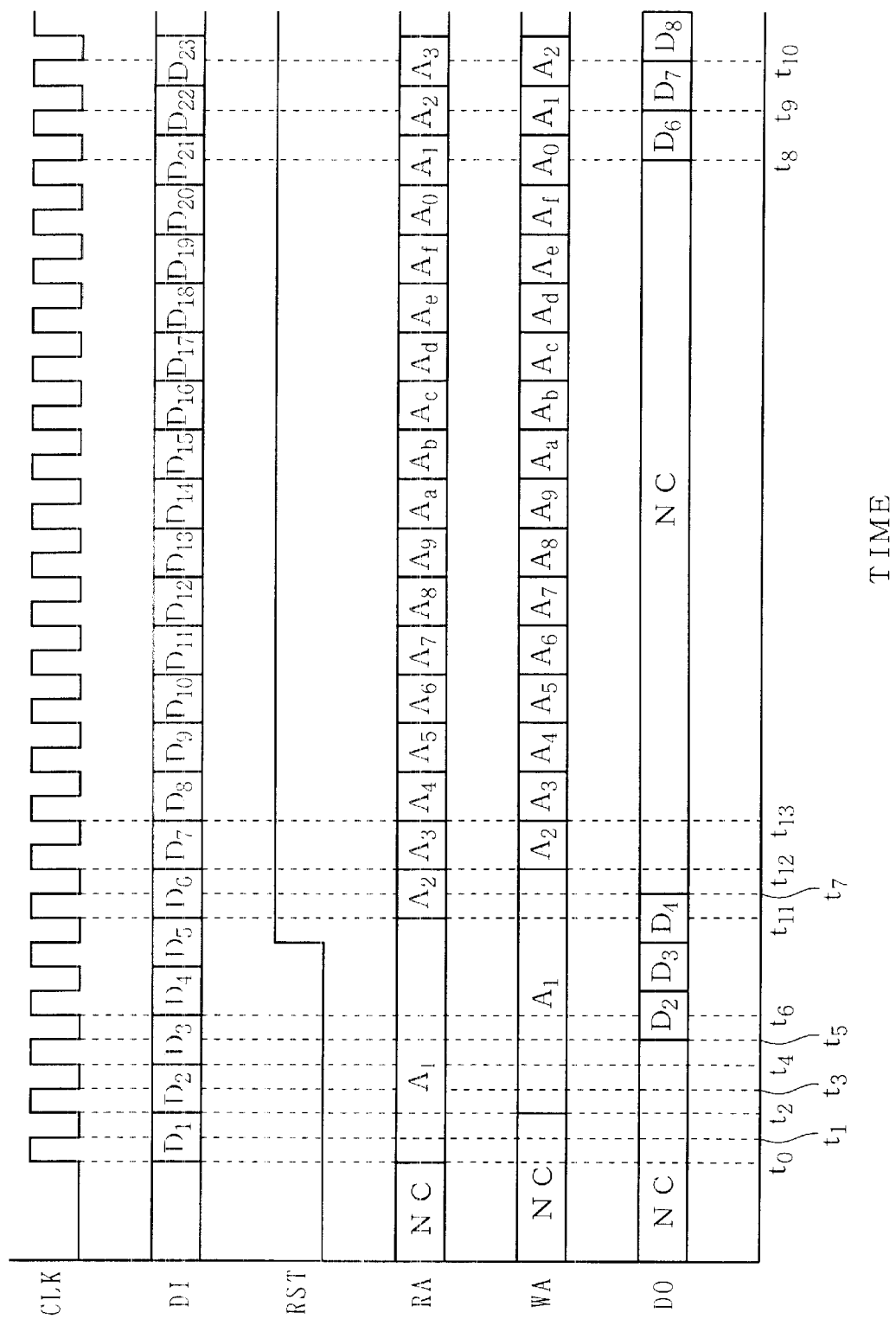
FIG. 4 is a timing chart of the operations of the present invention.
Figure 5:
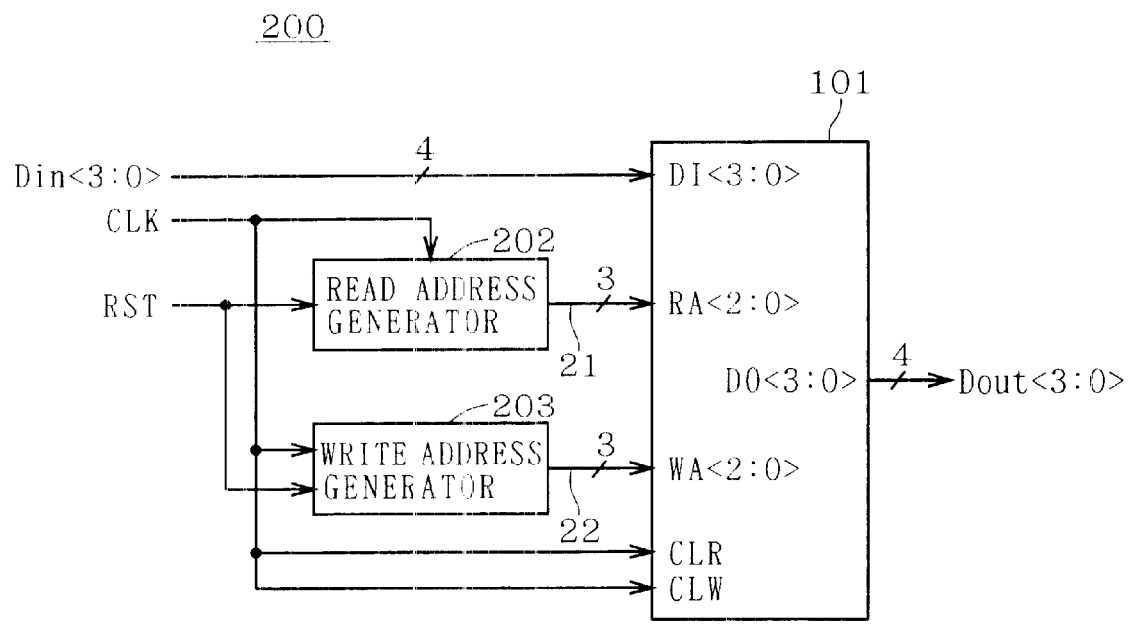
FIG. 5 is a circuit diagram of prior art.
Figure 6:
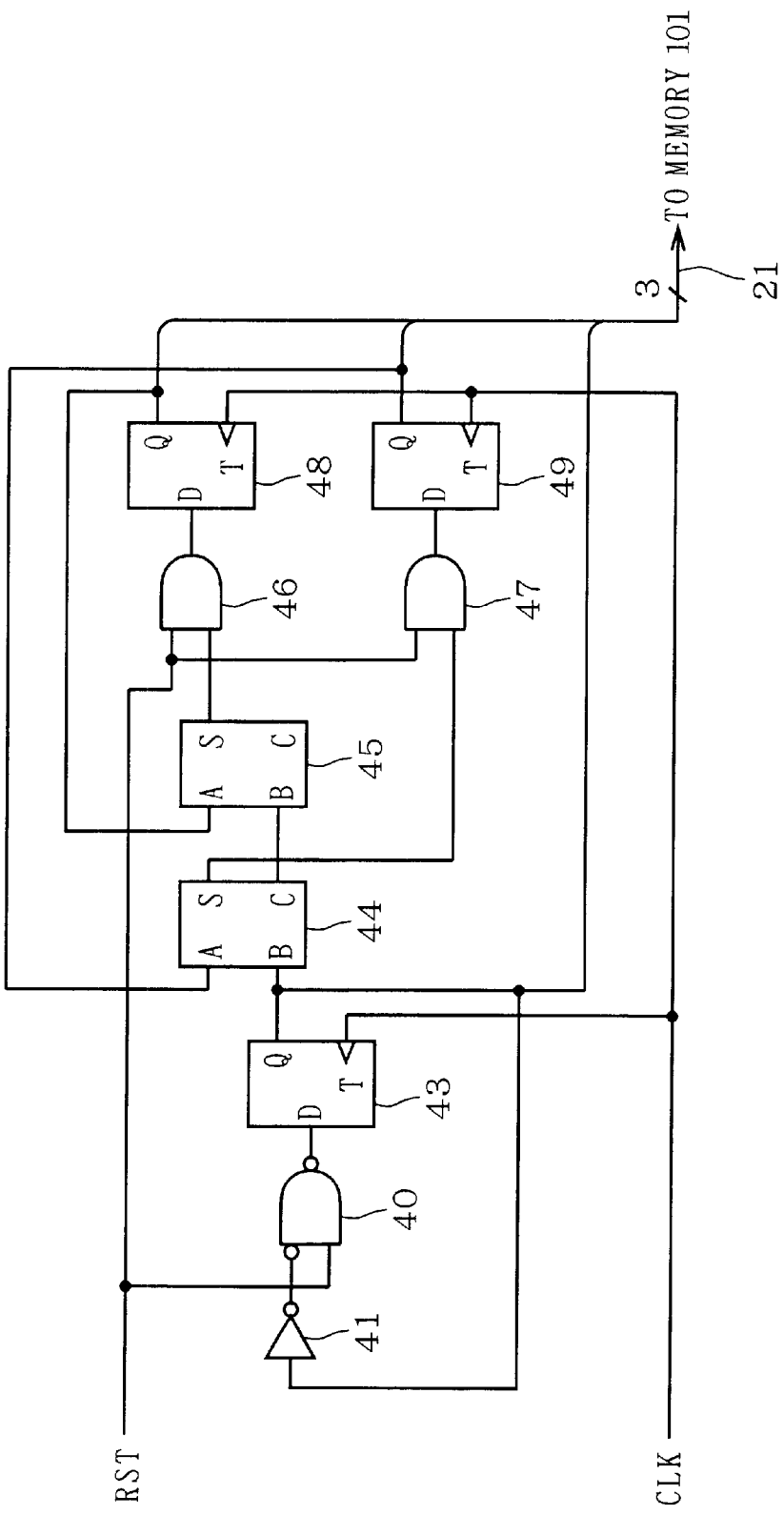
FIG. 6 is another circuit diagram of prior art.

As stated above, even if the number of the bits of address is increased, the present invention can be realized by providing the corresponding number of D-type flip-flops in the construction of the address delayer 103. FIG. 4 is a timing chart illustrating the operation of the present invention when both the read address 21 and the write address 22 are of 4-bit. In FIG. 4, symbols $D_1$, $D_2$, ... indicate the value of data to be inputted/outputted to the memory 100, $A_1$, $A_2$, ..., $A_9$, $A_a$, $A_b$, ..., $A_f$, $A_0$ indicate sixteen address values, and NC indicates that no value is defined. The clock CLK begins to generate pulses at time $T_0$. In synchronization with the rise of the clock CLK, data $D_1$, $D_2$, ... are provided sequentially to the data input end DI of the RAM 101. The reset signal RST remains in "L" at time $t_0$. Although the read address 21 taking value $A_1$ is being provided to the read address terminal RA of the RAM 101 at time $t_0$, the value of the write address 22 remains undefined. Then, the data stored at the address $A_1$ in the RAM 101 is given at the data output end DO by the fall of the clock CLK at time $t_1$. However, since the write operation to the address $A_1$ has not yet executed, the read data value is undefined.

Since the reset signal RST remains in "L" when the clock CLK rises at time $t_2$, the read address 21 keeps taking value $A_1$. On the other hand, the write address 22 also takes value Al by the operation of the address delayer 103. Then, data $D_2$ obtained by the update at time $t_2$ is written at the address $A_1$ in the RAM 101. However, since the write operation of the RAM 101 requires a period of one cycle, the data read from the address $A_1$ remains undefined when the clock CLK falls at time $t_3$.

Since the reset signal RST remains in "L" when the clock CLK falls at time $t_4$, both the read address 21 and the write address 22 take value $A_1$. Then, data $D_3$ obtained by the update at time $t_4$ is written at the address $A_1$ in the RAM 101. It should be noted that when the clock CLK falls at time $t_5$, the data $D_2$ written at the address $A_1$ in the RAM 101 at time $t_2$ is read instead of the data $D_3$ written at the address $A_1$ in the RAM 101 at time $t_4$. This is because the write operation of the RAM 101 requires time of one cycle of the clock CLK, as previously described. When the clock CLK rises at time $t_6$, data $D_4$ is written at the address $A_1$, thereafter, a similar operation is repeated until the reset signal RST transits to "H". Thus, there exits only a delay of one cycle in performing the operation of FIFO type.

Then, the value of the read address is updated to $A_2$ by the initial rise of the clock CLK after the reset signal RST becomes "H" (at time $t_{11}$). Immediately thereafter, at time $t_7$ at which the clock CLK falls, the data stored at address $A_2$ in the RAM 101 is read. However, since only the write operation to the address $A_1$ is terminated before the reset signal RST becomes: "H", the read data value is undefined. Thereafter, the value of the read address 21 keeps being updated in a similar manner, and the data obtained from the data output end DO remains undefined until time $t_8$.

The data read from the address $A_1$ at time $t_8$ is data $D_6$ which has been written at the address $A_1$ at time $t_{11}$, immediately after the reset signal RST becomes "H". Then, data $D_7$ and $D_8$ written at addresses $A_2$ and $A_3$ at time $t_{12}$ and $t_{13}$ are read at time $t_9$ and $t_{10}$, respectively. In this way, after time $t_8$, the operation of FIFO type with a delay of $(2^4-1)$ cycle is performed.

While the invention has been shown and described in detail, the foregoing description is in all aspects illustrative and not restrictive. It is therefore understood that numerous modifications and variations can be devised without departing from the scope of the invention.

I claim:

1. A FIFO type memory outputting data in a same order as receiving the data, comprising:
   a read address generator configured to generate a read address in synchronism with a clock signal applied to a clock signal input;
   an address delayor including a sequential circuit and connected to receive the read address generated by the read address generator and to provide a write address by delaying said read address in synchronism with said clock signal present on an input to the address delayor; and
   a storage element configured to input data in said same order to an address specified by said read address and to output data in said same order from an address specified by said write address, in synchronism with said clock signal.

2. The FIFO type memory of claim 1 wherein said read address is generated cyclically.

3. The FIFO type memory of claim 2 wherein the amount of delay of said address delayer is one cycle of said clock signal.

4. The FIFO type memory of claim 3 wherein,
   said address delayor has D-type flip-flops whose number is equal to the number of bits constituting said read address; and
   each bit of said read address is provided to a data input end of one of said D-type flip-flops.

5. The FIFO type memory of claim 4 wherein said clock signal is provided in common to each clock input end of said D-type-flip-flops.

6. The FIFO type memory of claim 1 wherein said storage element performs read and write operations in synchronization with the fall and rise of said clock signal, respectively.

7. The FIFO type memory of claim 1 wherein data input to said address specified by said write address is output from said address specified by the read address with a delay which is obtained by multiplying a cycle of said clock signal by a number obtained by subtracting a one from the number values that can be taken by said read address.

8. The FIFO type memory of claim 7 wherein said read address generator receives a reset signal and said reset signal takes a predetermined value to update said read address.

9. The FIFO type memory of claim 8 wherein data written at an address specified by said read address immediately after said reset signal has a predetermined value becomes the initial data for FIFO operation.

10. A FIFO type memory outputting data in a same order as receiving the data, comprising:
    a first address generator configured to generate a first address in synchronization with a clock signal applied to a clock signal input thereof;
    a second address generator configured to receive said first address and said clock signal, said second address generator including a sequential circuit for holding said first address in response to said clock signal, said second address generator outputting the address held in said sequential circuit as a second address; and
    a storage element having a first address input end receiving said first address output from said first address generator, a second address input end receiving said second address output from said second address generator, a data input end receiving data to be written therein, and a data output end outputting data stored therein,
    wherein the storage element is configured to have data received at said data input end written therein in said same order in accordance with a respective one of said received addresses while outputting data from said data output end in said same order in accordance with the other respective one of said received addresses.

11. The FIFO type memory of claim 10, wherein said storage element outputs data stored in an address indicated by said first address and writes data into an address indicated by said second address.

12. The FIFO type memory of claim 10, wherein said first address generator generates said first address cyclically.

13. The FIFO type memory of claim 10 wherein,
    said sequential circuit which includes flip-flops which receive bits of said first address, respectively, in response to said clock signal.

14. The FIFO type memory of claim 10, wherein said storage element receives said clock signal and operates in synchronization with said clock signal.

15. The FIFO type memory of claim 14, wherein said storage element performs a read operation of reading data stored therein in synchronization with a first transition of a first logical value to a second logical value in said clock signal and performs a write operation of writing data therein in synchronization with a second transition of the second logical value to the first logical value in said clock signal.

16. The FIFO type memory of claim 10, wherein data, which are input to said data input end, are output from said data output end with a delay which is obtained by multiplying a cycle of said clock signal by a number obtained by subtracting one from the number of values that can be taken by said first address.

17. The FIFO type memory of claim 10, wherein said first address generator receives a reset signal taking a predetermined value to update said first address.

18. The FIFO type memory of claim 1, wherein:

said read address generator outputs a first address value as the read address and said address delayor holds the first address value in said sequential circuit and outputs a second address value as the write address, the second address value being the same as the first address value, wherein said storage element outputs data from an address location in accordance with the first address value output from said read address generator and inputs data into an address location in accordance with the second address value output from said address delayor.

19. A FIFO type memory outputting data in a same order as receiving the data, comprising:

a first address generator configured to generate a first address in synchronization with a clock signal applied to a clock signal input thereof;

a second address generator configured to receive said first address and said clock signal, said second address generator including a sequential circuit for holding said first address in response to said clock signal, said second address generator outputting the address held in said sequential circuit as a second address; and a storage element having a first address input end receiving said first address output from said first address generator, a second address input end receiving said second address output from said second address generator, a data input end receiving data to be written therein, and a data output end outputting data stored therein, wherein the first address generator is capable of generating first to n-th values sequentially as the first address and repeating a generation of the first to n-th values in the same sequence with the first value following the n-th value.

20. The FIFO type memory of claim 19, wherein:

said first address generator receives a reset signal and an output of said first address generator is reset to one of said first to n-th values in response to the reset signal.

* * * * *